United States Patent [19]

Kaplan

[11] Patent Number: 5,687,258
[45] Date of Patent: Nov. 11, 1997

[54] BORDER TREATMENT IN IMAGE PROCESSING ALGORITHMS

[75] Inventor: Martin Charles Kaplan, Rochester, N.Y.

[73] Assignee: Eastman Kodak Company, Rochester, N.Y.

[21] Appl. No.: 709,228

[22] Filed: Sep. 3, 1996

Related U.S. Application Data

[63] Continuation of Ser. No. 298,534, Aug. 30, 1994, abandoned, which is a continuation of Ser. No. 765,506, Sep. 26, 1991, abandoned, which is a continuation-in-part of Ser. No. 653,919, Feb. 12, 1991, abandoned.

[51] Int. Cl.$^6$ .................................................. G06T 5/20
[52] U.S. Cl. ........................ 382/268; 382/308; 358/463
[58] Field of Search ........................ 358/447, 463, 358/464, 465; 382/268, 264, 303, 308; 348/625, 627, 628, 629, 578, 576; 355/71, 74

[56] References Cited

U.S. PATENT DOCUMENTS

| | | | |
|---|---|---|---|
| 4,484,346 | 11/1984 | Sternberg et al. | 382/27 |
| 4,559,644 | 12/1985 | Kataoka et al. | 382/61 |
| 4,591,896 | 5/1986 | Edelson | 358/182 |
| 4,736,439 | 4/1988 | May | 382/54 |
| 4,791,676 | 12/1988 | Flickner et al. | 382/41 |
| 4,827,344 | 5/1989 | Astle et al. | 358/182 |
| 4,875,097 | 10/1989 | Jackson | 358/182 |
| 4,954,883 | 9/1990 | Belmares-Sarabis et al. | 358/183 |
| 4,979,229 | 12/1990 | Moolenaar | 382/47 |
| 5,006,938 | 4/1991 | Mita | 358/455 |
| 5,022,085 | 6/1991 | Cok | 358/183 |
| 5,091,972 | 2/1992 | Kwon et al. | 382/254 |
| 5,119,440 | 6/1992 | Duenyas et al. | 382/22 |
| 5,157,740 | 10/1992 | Klein et al. | 382/51 |

*Primary Examiner*—Joseph Mancuso
*Assistant Examiner*—Larry J. Prikockis
*Attorney, Agent, or Firm*—Peyton C. Watkins

[57] ABSTRACT

A border treatment is supplied to an image which is to be processed by using an algorithm operation on a neighborhood surrounding each image pixel of the image. The border provides a high frequency high contrast area which appears to the image processing system as an undesirable area and which is eliminated thereby allowing an uninfluenced treatment of each of the pixels in an image including the pixels at the edges of an image. Any neighborhood influence resulting from border pixels near the edge of the image is eliminated because these border pixels appear as noise which is eliminated. The appearance of noise is due to the high frequency alternation of contrasting areas which are processed as noise and thereby eliminated.

3 Claims, 3 Drawing Sheets

BORDER TREATMENT IN IMAGE PROCESSING ALGORITHMS

This is a Continuation of application Ser. No. 08/298, 534, filed 30 Aug. 1994 now abandoned, which is a continuation of U.S. Ser. No. 07/765,506 filed Sep. 26, 1991, which is a continuation-in-part of U.S. Ser. No. 07/653,919 filed Feb. 12, 1991 (both now abandoned).

CROSS-REFERENCE TO RELATED APPLICATIONS

The present application is related to U.S. patent application Ser. No. 399,134 filed on Aug. 28, 1989, entitled "Digital Image Noise Reduction of Luminance and Chrominance Based on Overlapping Planar Approximation" by M. C Kaplan et al. now U.S. Pat. No. 5,563,963, issued on Oct. 8, 1996 and U.S. patent application Ser. No. 399,135 filed on Aug. 28, 1989, entitled "A Computer Based Digital Image Noise Reduction Method Based on Overlapping Planar Approximation" by M. C. Kaplan et al, now U.S. Pat. No. 5,533,149, issued on Jul. 2, 1996.

TECHNICAL FIELD OF THE INVENTION

The present invention is broadly directed to the field of image data processing and, more particularly, to a method of treating an image in order to enhance the resolution capabilities of image noise reduction algorithms.

BACKGROUND OF THE INVENTION

The transformation of a digital image to a finished high quality print involves a reduction in noise components which are introduced because of the transformation of the image from the original scene to the electrical signals.

Prior art methods for reducing noise revolve around the concept of the grey levels in neighborhood pixels which basically smooths the differences between the values of the grey levels in the various neighborhoods. Such a system obviously fails in the regions containing sharp detail between specific portions because this sharp detail will be lost due to the smoothing process.

Another method involves selecting pixels to be treated and obtaining perspective values based on a stated relationship with a probability function being used to determine whether a questionable pixel should be maintained at its present value or raised to the perspective value. Such a system is indicated in U.S. Pat. No. 4,734,770 entitled, "Image Data Processing Method and Device Therefor" by L Matsuba. The probability formula includes the image energy component with a recognition being made for edges of patterns based on the energy level comparisons. Thus, when a high energy level difference occurs between a central and an adjoining pixel, such high probability would define, according to the probability function, an edge.

The above-mentioned cross-referenced related applications perform smoothing operations by determining edge regions and by leaving those regions undisturbed or unoperated upon and by applying a smoothing function to the smooth regions in order to reduce the noise in the areas. The purpose of the methods used in the cross-reference related applications is to identify whether a pixel belongs to an edge or to a smooth region and to compute a smoothing code value for the pixel if it does belong to a smooth region.

Although the methods of the cross-reference related applications perform satisfactorily, there is an area of improvement required with respect to the treatment of the edge values in order to more clearly define an edge and to perform operations which do not have an effect of smoothing out the edge to such a degree that the edge becomes relatively grey instead of its true color. That is, because the edge of the picture is a high contrast area, smoothing operations tend to smooth or grey out the edge areas instead of presenting the true image of the area near the edge.

Another example of prior art methods of providing a simple means for an algorithm to handle the borders of an image without the need for special rules in the algorithm, which apply only at the border, is the reference to Flickner, U.S. Pat. No. 4,791,676. Flickner concerns himself with a problem which is solved by penetrating the borders only a single-pixel depth.

Thus prior art recognition of edge problems with image processing has generally led to solutions which either provide for special rules for algorithms which are complicated and difficult to administer and which still provide rough approximations at the border leading to grey areas instead of the true "picture" or a second solution involves that of the prior art such as Flickner wherein the edges of the images are attempted to be handled utilizing labeling priority rules near the edge or frame of a picture. Flickner substitutes the inverse of the value of the current image pixel being labeled in place of an undefined border pixel outside the viewed image portion.

Despite these attempts to deal with the edge of a picture in the prior art there still remain problems concerning lack of sufficiently detailed treatment at the border without involving special treatment of algorithms which is a costly and time-consuming process. On the other hand, sacrificing image quality at the edge of a picture by rough approximations, although saving image processing time and expense, does not provide precise picture quality especially where there is a high contrast area near the border.

SUMMARY OF THE INVENTION

Therefore, it is a primary object of the present invention to provide a treatment to the border of an image which is digitally processed in order to effectively handle image processing which occurs near the edge of the image.

The primary object is carried out through the addition of a highly textured data border strip placed around the edges of an image to be digitally processed in order to provide for handling of image processing techniques involving neighborhoods and particularly neutralizing neighborhoods outside of the image border. These neutralizing neighbors which are outside of the picture result in an image which has its border digitally processed by image noise reduction algorithms and the like in a manner which is consistent with the rest of the image and in such a way that the image near the border is not compromised.

These and other objects of the present invention will become more apparent when taken in connection with the following description and drawings wherein like characters indicate like parts and which drawings form a part of the present description.

DESCRIPTION OF THE PREFERRED EMBODIMENTS

The establishment of a surrounding border on an image which is digitally processed is particularly based upon the motivation to provide a border which will be effectively "ignored" by any digital processing which uses neighborhoods and which neighborhoods by their nature near the border extend beyond the edge of the image. The field of image data processing demands an edge treatment which is compatible with state of the art digital processing techniques and which provides the aforementioned ability to process the edge of the image utilizing the concept of neighborhood pixels and still retain the true image of the border.

Data processed images with respect to noise reduction techniques such as those in U.S. Pat. No. 4,734,770 treat a first image data set which is a plurality of pixels having values corresponding to their grey level and some of which contain noise components. This treatment involves transforming them into other image data in order to reduce the noise components appearing in the revised image data. Pixels are selected for treatment and proposed values are obtained which are given to object pixels based on the stated relationship. Subsequently a probability function determines whether a pixel in question should be raised to the proposed value or maintained at its present value. The probability formula includes image energy component and a prior art recognition is made for edges of patterns based on energy level comparisons.

Figure 1:
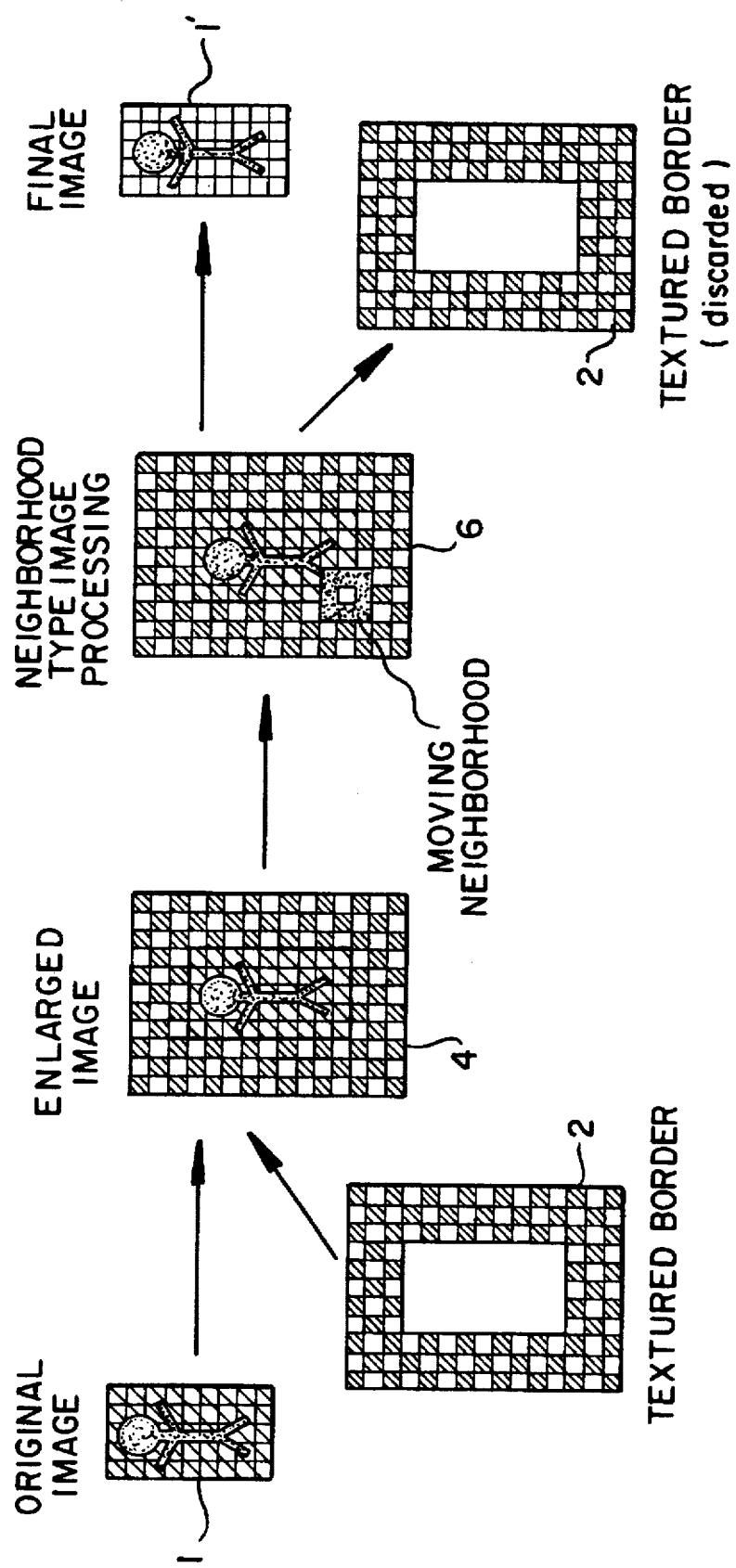
FIG. 1 illustrates a sequence of steps for processing an image with a highly textured added border according to the present invention.

The process steps of FIG. 1 are based upon the utilization of a border which has been called a highly textured border. The definition for a highly textured border is a border having a plurality of alternately black and white images with the alternation occurring frequently or at a high frequency. This means effectively that there is a black space and in any particular direction a white space pixel will be encountered within a short distance. Thus highly textured can also be called a high frequency sharp contrast region.

FIG. 1 shows such a highly textured (sharp contrast high frequency) border treatment 2 for an image picture 1. The frequently occurring alternations of black and white are illustrated generically in the border 2 of FIG. 1.

The highly textured border 2 effectively serves as a "noisy" area which, utilizing data processing of images by noise reduction techniques such as the technique disclosed in U.S. Pat. No. 4,734,770, provides an area which is to be discarded. That is, any noisy pixels are thrown out and the border functions as a noisy series of pixels. More specifically, when the digital image processing utilizes noise reduction techniques a series of pixels around each image pixel is "tested" for any noise and the differences between the values of the grey levels of pixels located in neighborhoods is smoothed. The problem occurs of course when this smoothing process is used at the edge of the picture because some of the pixels in the neighborhood near the edge or at the edge of an image will of course be "off the edge of the picture". Therefore the edge values are blurred because of the necessary input derived from those pixels in the neighborhood of the edge pixel but which are off the picture.

If a border is added which is either grey or zero-valued then the edge values are basically averaged or smoothed. This may function satisfactorily in certain instances but if the pixel near the edge or at the edge is a representation of a sharp color such as green grass the picture will obviously be blurred or improperly colored due to the smoothing effect necessary because of the image created because the pixels in the neighborhood are "off the picture". The highly textured border added according to the present invention provides a high-frequency contrasting neighborhood at the end of the picture which is read by the noise reduction technique as a "noisy bunch of pixels" which are to be thrown out. Thus if the neighbor pixels which are "off the image" are thrown out without any averaging occurring then the remaining pixels in the neighborhood which are also "in the picture" can be effectively averaged and tested to provide a true image at the border.

Because of the nature of the highly textured border, a digital image noise reduction technique will see the highly texturized border as noise which is to be eliminated. Once this noise is eliminated the picture is "perfected".

There are two essential features to creating this "noisy border" or highly textured border. The first of these is alternately high contrasting areas. In other words one area is white followed by another area being black. The second and most important feature is that these black and white alternating areas must be frequently occurring or known as high frequency in the art. That is there must be many transitions between black and white over any particular space in order for all of the border to be "seen" by the image processing noise reduction technique as "all noise".

In the preferred embodiment of the invention, the textured border is "checkered". That is it contains alternate squares of black and white. The greater the number of black and white areas per each unit area, the greater will be the probability that it will be seen as noise and eliminated from the calculation of the neighborhood values. It must be noted that there is a difference between eliminating these neighborhood pixels outside of the image vs. guessing or assigning a proposed value or assigning a estimated value. When each of these assignments of estimated values or proposed values is utilized invariably blurring will occur because it is after all a guess as to not only what is on the border but what would ordinarily be on the border.

The combined original image and textured border, denoted 4, form an enlarged image. Using a neighborhood type processing with the neighborhood shown as a dark square that is moved over the surface of the combined image and the textured border. Noise is removed from the original image 1 to yield the final image 1.

Figure 2:
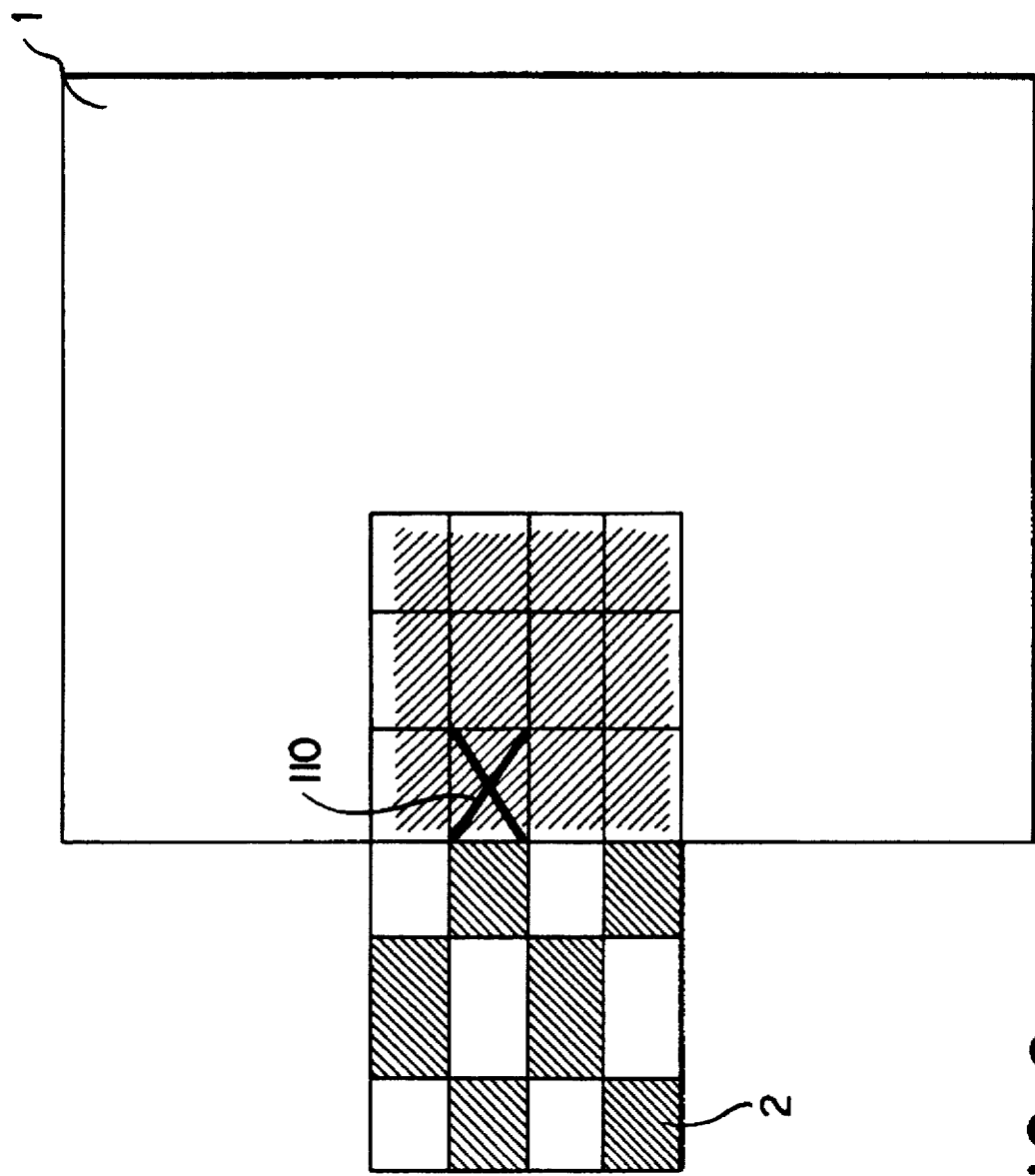
FIG. 2 illustrates an image pixel with some neighborhood pixels in a textured border.

FIG. 2 is a magnification illustrating the edge of the picture 1 and its interaction with the border R. More particularly an edge picture element 110 is shown surrounded by its neighboring elements including elements from the picture 1 and neighboring elements from the border 2. According to image processing techniques such as the noise reduction technique in U.S. Pat. 4,734,770 all of the checkered black and white picture elements in the border 20 which form the neighborhood of the picture element 110 will be seen by the noise reduction algorithm as totally noise and eliminated from the averaging or calculation of the value for the picture element 110. The recognition of the border 2 as noise is a function of the contrast between the black and white regions and the frequency of occurrence of the black and white regions. The frequency of occurrence leads to a high frequency signal and the contrast leads to a peak value to the high frequency signal. The combination of the high amplitude and the high frequency lead to an elimination as noise.

The estimating of the border values used in the prior art for the smoothing can be much more sophisticated and can also be in some instances fairly accurate. However, the treatment that is necessary or the algorithms that are necessary to be created require extensive operations based upon a particular image.

Utilizing the highly textured added border as generally indicated at FIG. 1 and as specifically indicated at FIG. 2 provides an assurance of "noise" by which the algorithm for noise reduction in the image such will reliably discard leaving only the neighborhood of the image. That is the image on the border will only have its averaging based upon pixels in the neighborhood which are part of the picture and not of the border.

Although illustrated generically in FIG. 1 and as a checkerboard example in FIG. 2, numerous additional borders can be envisioned which meet the requirement of a highly textured (high frequency contrast) border. That is as long as there are areas of black and white alternately or randomly the image processing algorithm will ignore these border pixels.

The addition of the borders to an image prior to digital processing is a relatively simple matter which can be written as a program or code to be added to the image or any image which needs to be processed. Because of the high contrast black and white requirements of the border there is no need for changing of the border depending on the picture being utilized simply because the border is constructed so that noise reduction techniques will ignore those pixels in the border rather than average or guess their values. Also variable is the width of the border. In a preferred embodiment the width of the border is greater than the size or radius of any technique of image processing being utilized.

This method is also applicable to other image processing techniques wherein the neighboring pixels are tested for various values. Any features the pixels are tested for or the magnitude of those features can be effectively dealt with by providing a border which has alternating series or groups of opposite extremes of the features being sought. In the preferred embodiment the black and white areas provide the alternating extremes so that the algorithm noise reduction "sees" the high contrast high frequency mixture as noise and thus is subject to being thrown out. Simply stated, the border creates noise so that the noise reduction technique can throw it out or totally ignore it. The same would be true for other systems which look for other features which are to be eliminated. The borders would then provide the very features which are going to be ignored so that those pixels will be thrown out thus leaving only image pixels without any averaging or without any estimating of values.

Figure 3:
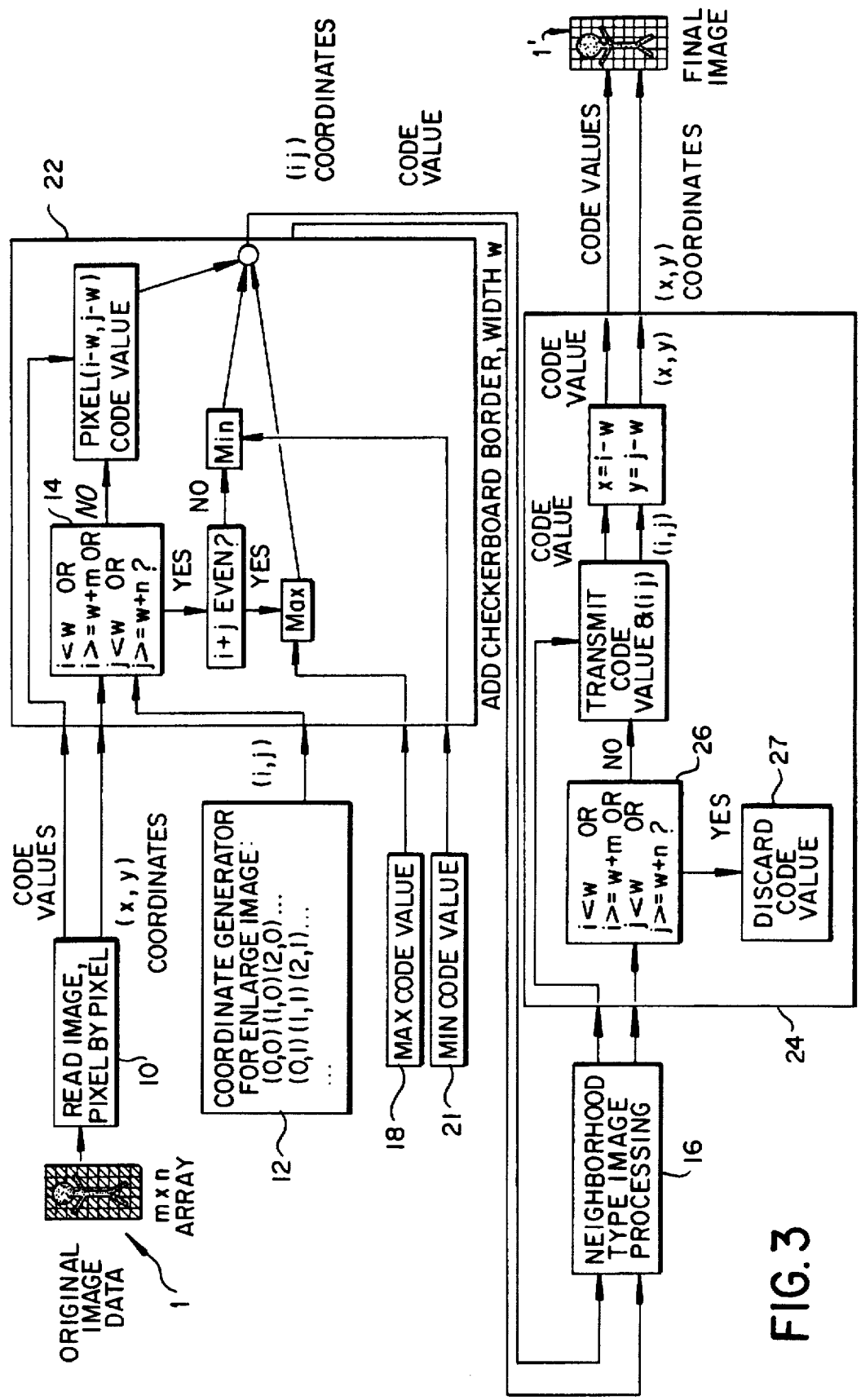
FIG. 3 illustrates in block diagram from the processing of an original image by the addition of a textured border according to the present invention.

FIG. 3, the original image 1 is represented by an mxn array which is read out, pixel by pixel, to provide a code value, associated with each pixel that is identified by its (x,y) coordinate.

A coordinate generator 12, generates the $i_1$ values to enlarge the image. The checkerboard border has a width defined as W. A logic block 4, incorporated in a checkerboard border generator 22, compares the values of i and j with respect to W and the array values m and n. If the comparison results in a "No" the pixel code value is passed to the neighborhood image process 16. If the answer is "yes" the values of i and j are compared to see if they are even. If the answer is "yes" a maximum code value is generated by block 18 and forwarded to block 16. If the answer is "no" a minimum code value is generated by block 21 and forwarded to block 16. In block 16 the noise removing algorithm is applied.

In block 24 the code values associated with the border, of width E, are discarded by the logic block 26 and the action block 27. The code values that have not been discarded are then translated into the output or final image 1'.

While there has been what are considered to be the preferred embodiments of the invention, it will be manifest that many changes and modifications may be made therein without departing from the essential spirit of the invention. It is intended, therefore, in the annexed claims, to cover all such changes and modifications as may fall within the true scope of the invention.

I claim:

1. An image processing technique implementing neighborhood processing, comprising the steps of;

capturing a first image having a plurality of pixels, the pixels having three or more values corresponding to their gray levels, to be digitally processed by an image processing system that includes a noise reduction system, wherein said noise reductive system uses neighborhood processing;

digitally creating, via said image processing system, a predefined border image exterior of and adjacent to the entirety of said first image, to thereby create an enlarged image, wherein said border image consists of a highly textured area in said enlarged image to be detected by said noise reduction system; and digitally processing said enlarged image utilizing said noise reduction system and recognizing at least portions of the entirety of said predefined border image as a highly textured area when encountered by said noise reduction system; wherein said portions recognized as said highly textured area are eliminated from contributing to said neighborhood processing.

2. The method according to claim 1 wherein said border image is an alternating pattern of black and white picture elements.

3. The method according to claim 2 wherein said alternating pattern is a checkered pattern having a high frequency of repetition.

* * * * *